United States Patent

[11] 3,593,082

[72] Inventors: Susumu Tadakuma;
Yasuaki Miyazaki, both of Yokohama-shi, Japan
[21] Appl. No. 758,553
[22] Filed Sept. 9, 1968
[45] Patented July 13, 1971
[73] Assignee Tokyo Shibaura Electric Co., Ltd. Kawasaki-shi, Japan
[32] Priority Sept. 30, 1967
[33] Japan
[31] 42/62746

[54] AC MOTOR DRIVING MEANS
6 Claims, 8 Drawing Figs.
[52] U.S. Cl. .................................................. 318/227, 318/231, 318/258, 318/302
[51] Int. Cl. .................................................. H02p 5/38
[50] Field of Search .......................................... 318/302, 341, 20.515, 258, 227, 231

[56] References Cited
UNITED STATES PATENTS

| | | | | |
|---|---|---|---|---|
| 3,175,167 | 3/1965 | Lloyd | | 318/231 |
| 3,243,677 | 3/1966 | Cannalte et al. | | 318/231 |
| 3,344,326 | 9/1967 | Risberg | | 318/231 |
| 3,293,522 | 12/1966 | Lewis | | 318/257 |
| 3,463,991 | 8/1969 | Yuminaka et al. | | 318/258 |

Primary Examiner—Oris L. Rader
Assistant Examiner—K. L. Crosson
Attorney—George B. Oujevolk ABSTRACT: AC motor driving means comprising a DC source, an inverter converting said DC to AC, a semiconductor switch element connected in parallel to the motor connected to the output terminal of the inverter which serves to short the motor terminals, and a control means to allow only a 120° period output to be issued by the inverter per semicycle.

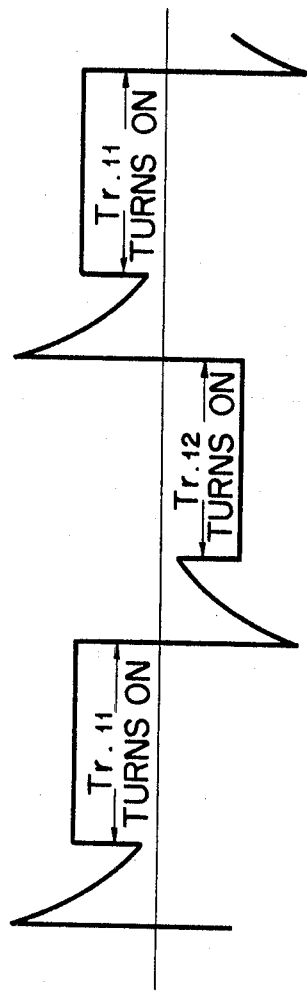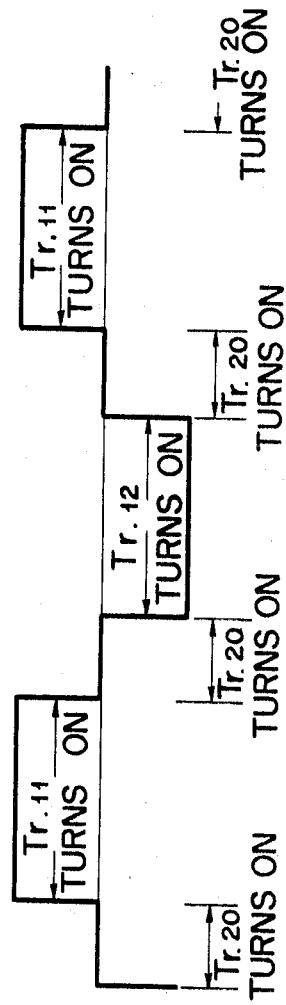

AC MOTOR DRIVING MEANS

BACKGROUND OF THE INVENTION

The present invention relates to a motor driving means and particularly to a motor driving means using a 120° mode rectangular wave voltage. There has hitherto been known a motor driving means which is provided with a rectangular wave generator, for example, an astable multivibrator and drives the motor by rectangular wave outputs from the rectangular wave generator. This rectangular wave voltage permits the motor driving means to be constructed extremely simply. When developed into a Fourier series, the rectangular wave voltage may be expressed by the following equation;

$$e = \frac{4E}{\pi}\left(\sin \omega t + \frac{1}{3}\sin 3\omega t + \frac{1}{5}\sin 5\omega t + \ldots\right)$$

(where $e$ represents an instantaneous value and $E$ a maximum value)

As clearly seen from the equation, the rectangular wave contains a large number of harmonics, particularly those of the third order. As is well known, such harmonics lead to the irregular rotation of the motor. For instance, where the motor motor is used in recording or reproducing signals by driving the rotary magnetic head of a magnetic recording and reproducing device, the aforementioned irregular motor rotation will sometimes result in the deformation of sounds or pictures in recording or reproducing signals.

SUMMARY OF THE INVENTION

It is accordingly the primary object of the present invention to provide an AC motor driving means using a 120° mode rectangular wave voltage which is relatively free from harmonics.

Another object of the invention is to provide a motor driving means of simple construction which enables the 120° mode rectangular wave voltage to be unfailingly obtained.

More specifically, the present invention provides a motor driving means comprising a DC source, an inverter connected to the DC source, a semiconductor switch element connected in parallel to the motor connected to the output terminal of the inverter and a control mechanism for the inverter which controls the inverter so as to allow only a 120° period output to be issued by the inverter per semicycle and turns on the semiconductor switch element only during other intervals than the 120° period to short the motor terminals.

BRIEF EXPLANATION OF THE DRAWINGS

FIG. 3D shows the applied voltage at the terminals of a motor without a semiconductor switch element; and, FIG. 3E is the modified voltage of FIG. 3D with the semiconductor switch element shorted;

DETAILED DESCRIPTION OF THE PREFERRED EMBODIMENT

Figure 1:
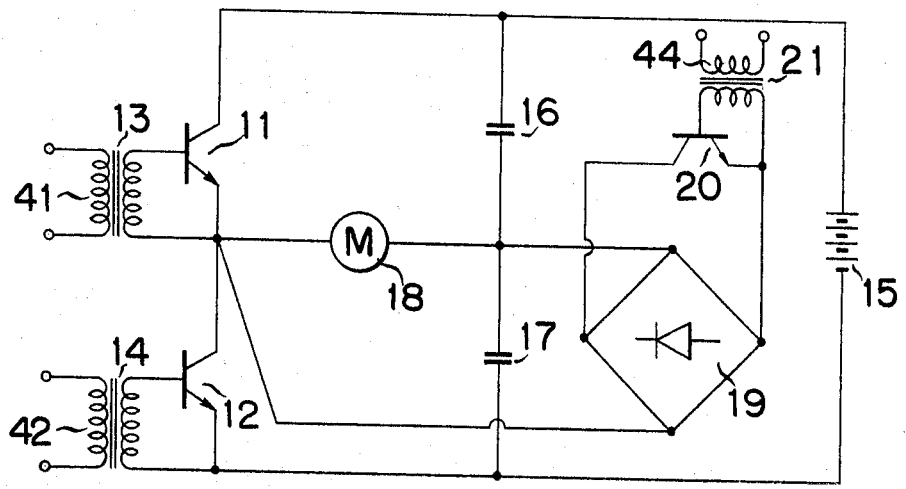
FIG. 1 is a circuit connection diagram illustrating an inverter used in an embodiment of the motor driving means according to the present invention.

There will now be described the present invention by reference to the illustrated embodiment. Referring to FIG. 1, there are supplied control signals differing from each other by a period of 180° phase from the later described drive circuit across the base and emitter regions of first and second NPN type transistors 11 and 12 through the respective transformers 13 and 14 thereof. The emitter region of the first transistor 11 is connected to the collector region of the second transistor 12. The collector region of the first transistor 11 is connected to the positive terminal of the DC source 15 and the emitter region of the second transistor to the negative terminal thereof. Between both terminals of the DC source 15 are serially arranged condensers 16 and 17. Across the contact point of the condensers 16 and 17 and the contact point of the emitter region of the first transistor 11 and the collector region of the second transistor 12 is connected to the AC motor 18. Also the two input terminals of a full wave rectification circuit 19 comprising, for example, four bridged diodes are connected to the aforesaid two contact points respectively. The two output terminals of the full wave rectification circuit 19 are connected across the collector and emitter regions of, for example, an NPN type transistor 20 to short the terminals of the motor 18. And across the base and emitter regions of the transistor 20 are supplied control signals from the later described drive circuit through a transformer 25.

Figure 2:
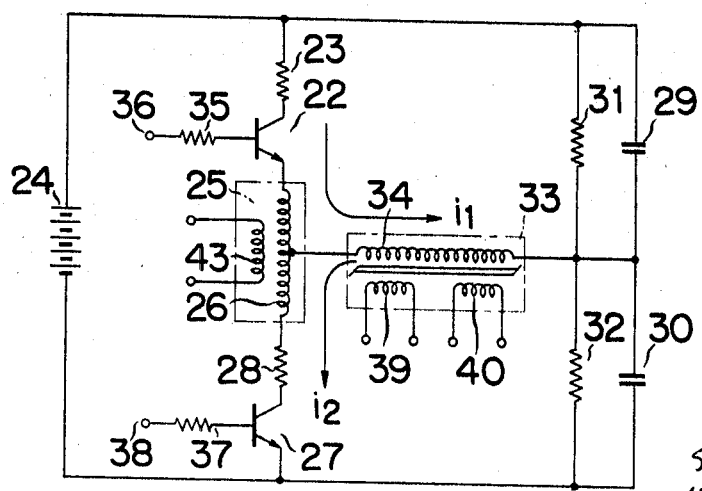
FIG. 2 is a circuit connection diagram illustrating a means for actuating the inverter of FIG. 1.

The inverter drive circuit is constructed as shown in FIG. 2. Namely the collector region of the first NPN type transistor 22 is connected through a resistor 23 to the positive terminal of the DC source 24, and the emitter region of the transistor 22 is connected to one end of the primary coil 26 of a transformer 25. The collector region of the second NPN type transistor 27 is connected through a resistor 28 to the other end of the primary coil 26 of the transformer 25, and the emitter region of the transistor 27 is connected to the negative terminal of the DC source 24. The series circuit of condensers 29 and 30 is connected across the terminals of the DC source 24, and resistors 31 and 32 are connected in parallel to the condensers 29 and 30. Further across the intermediate terminal of the primary coil 26 of the transformer 25 and the contact point of the condensers 29 and 30 is connected the primary coil 34 of a saturable transformer 33 having a rectangular hysteresis property. The base region of the transistor 22 is connected through a resistor 35 to the input terminal 36 thereof and the base region of the transistor 27 is connected through a resistor 37 to the input terminal 38 thereof. The secondary coils 39 and 40 of the saturable transformer 33 are connected to the respective primary coils 41 and 42 of the transformers 13 and 14 included in the inverter drive circuit. The secondary coil 43 of the transformer 25 is connected to the primary coil 44 of the transformer 21. Otherwise, the signals of the secondary coils 39, 40 and 43 directly drive the respective transistors 11, 12 and 20. The group of the resistors 23 and 28 and the group of the resistors 31 and 32 are respectively set at an equal value of resistance and both condensers 29 and 30 are arranged to have the same capacity. The input terminals 36 and 38 of the respective transistors 22 and 27 are supplied from a source of signals (not shown) with input signals of both normal and inverse phases having a frequency $f$ thereby to turn on the transistors 22 and 27 alternately at a prescribed period. When the transistor 22 is turned on and the transistor 27 is turned off, then the current $i_1$ will flow through a closed circuit in the order of power source 24 → resistor 23 → transistor 22 → transformer 25 → saturable transformer 33 → parallel circuit of condenser 30 and resistor 32 → power source 24. With the impedance on the primary side of the transformer 25 at this time represented by $Z$, then the voltage across both terminals of the primary coil of the saturable transformer 33 will have a value of $E/2 - i_1 R_1 - i_1 Z$ (where $E$ represents a source voltage and $R_1$ the resistance value of the resistor 23). The core of the saturable transformer 33 has an square hysteresis loop. Therefore with the saturated magnetic flux expressed $\Phi_s$, there will be established the following equation:

$$\frac{1}{3f}\left(\frac{E}{2} - i_1 R_1 - i_1 Z\right) = 2\phi_s$$

Figure 3A:
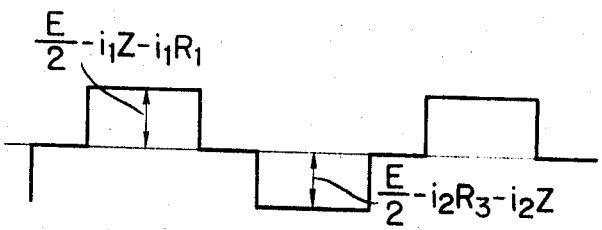
FIGS. 3A and 3B show output voltage curves of secondary coils of a transformer wherein each of said secondary coils provides voltage which drives a transistor.
Figure 3B:
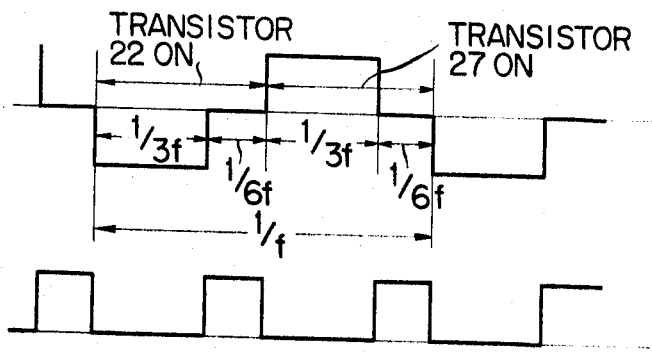
Figure 3C:
FIG. 3C is the output voltage of a secondary coil of another transformer wherein the voltage also drives a transistor.

Accordingly, as shown in FIGS. 3A and 3B, the secondary coils 39 and 40 of the transformer 33 are excited with a voltage corresponding to a magnetic flux of 2 s only during the initial period of 1/3f, whereas during the following 1/6f period, no voltage is excited due to the saturation of the core. While the saturable transformer 33 is saturated, increased portions of the current resulting from the sharp drop of impedance of the transformer 33 flow to the transformer 25, causing the terminal voltage thereof rapidly to rise with the resulting generation of a voltage in the secondary coil 43 as shown in FIG. 3C.

When the polarity of signals supplied to the input terminal is reversed to cause the transistor 22 to be turned off and the transistor 27 to be turned on, then the current $i_2$ will flow through a closed circuit in the order of source 24 → parallel circuit of condensers 29 and resistor 31 → saturable transformer 33 → transformer 25 → resistor 28 → transistor 27 → power source 24. Then the voltage across both terminals of the primary coil of the saturable transformer 33 will have a value of $E/2 - i_2 R_3 - i_2 Z$ where $R_3$ represents the resistance value of the resistor 28.

Consequently as in the preceding case, the secondary coils 39 and 40 of the transformer 33 are excited, as shown in FIG. 3A and 3B, with a voltage corresponding to a magnetic flux of $2\Phi s$ only during the initial period of 1/3f, whereas during the following 1/6f period, no voltage is excited due to the saturation of the core. While the saturable transformer 33 is saturated, the terminal voltage of the transformer rapidly increases to generate a voltage in the secondary coil 43 as shown in FIG. 3C. When the inverter for motor driving circuit shown in FIG. 1 is controlled by the inverter drive circuit shown in FIG. 2, the terminal voltage of the motor 18 will be as shown in FIG. 3D in the absence of a diode bridge circuit and transistor 20. Consider for example, the moment at which the transistor 11 is turned off after the lapse of the "on" period 1/3f. At this moment, a large electric voltage $e_1$ is produced across both terminals of the motor winding by electromagnetic energy stored in the winding of the motor 18. When this voltage is applied, together with the voltage of the condenser 16, to the transistor 11, the resultant voltage exceeds a maximum rated voltage with an eventual failure of the transistor. On the other hand, when the transistor 12 is switched from the "on" condition to the "off" condition, a voltage is also produced across both terminals of the motor winding and in a direction opposite to said voltage $e_1$, the voltage of which is applied together with a voltage of the condenser 17, to the transistor 12. Said excess voltage generated upon switching of the transistor 11 or 12 from the "on" condition to the "off" condition will cause the voltage across both terminals of the motor winding to be greatly distorted, even if the transistor does not fail, thereby producing a greatly distorted voltage waveform as shown in FIG. 3D. Since this voltage contains a plurality of harmonics which will cause performance of the motor winding during the "off" period of both transistors 11 and 12 by a short circuit comprising a bridge circuit 19 and a transistor 20 will produce a perfect 120° mode rectangular wave voltage as shown in FIG. 3E. (However, if a resistor is inserted into the short circuit, the perfect 120° mode rectangular wave voltage is not obtained.) The voltage applied to the transistors 11 and 12 is very stable, since it does not exceed the value of the voltage of the power source 15.

There will now be described the operation of the inverter device constructed in the aforementioned manner by reference to the waveforms shown in FIGS. 3A to 3C. Where the AC motor 18 is supplied with a 120° mode rectangular wave voltage, the first and second transistors 11 and 12 are impressed through the respective transformers 39 and 40 with 120° mode signals differing from each other by a period of 180° phase as shown in FIGS. 3A and 3B. The first and second transistors 11 and 12 are alternately operated to supply a rectangular wave voltage to the AC motor 18. In this case the switching transistor 20 is supplied with a rectangular wave signal as shown in FIG. 3C through the transformer 25, so that while the first and second transistors 11 and 12 are both turned off, the transistor 20 is turned on.

Though the motor 18, viewed as a load on the inverter, may be of an inductive nature, the electromagnetic energy energy stored in the motor 18 will be dissipated by the DC resistance of the windings, bridge member 19 and transistor 20, because, when both first and second transistors 11 and 12 are turned off, the motor 18 is shorted through the bridge member 19 and the transistor 20 by the switching transistor 20 turned on. Consequently even when both transistors 11 and 12 are turned off there is no possibility of unnecessary voltage being generated at both ends of the motor 18 due to the electromagnetic energy stored in an inductive loads.

The significance of using a 120° mode inverter as a motor driving means will be made quite clear by comparison of equation 1 with the following equation developed into a Fourier series relative to the 120° mode rectangular wave voltage:

$$e = \frac{2\sqrt{3E}}{\pi} \left( \sin \omega t - \frac{1}{5} \sin 5\omega t + \frac{1}{7} \sin 7\omega t + \ldots \right) \quad 3$$

As seen from the above equation 3, the voltage is relieved of the harmonics of the third order and those of multiples of said order. Particularly, elimination of the third order harmonics allows the motor to be driven so smoothly that irregular rotations, if any, could be practically overlooked.

Figure 4:
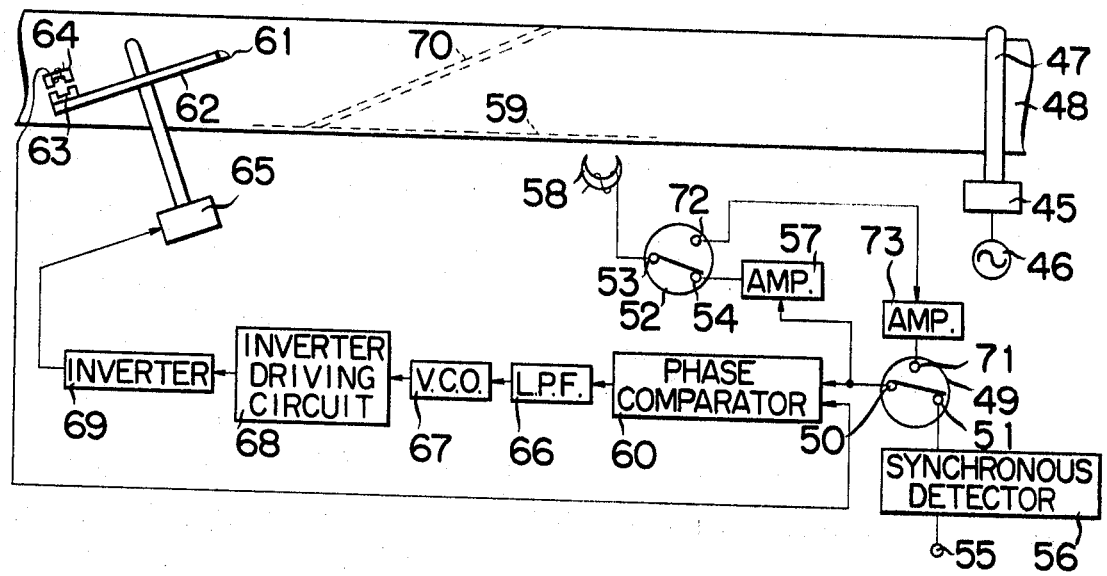
FIG. 4 is a schematic circuit connection diagram illustrating a magnetic recording and reproducing device using a motor operated by the driving means of the present invention.

FIG. 4 presents a magnetic recording and reproducing device using the aforementioned 120° mode semiconductor inverter. When video signals are recorded, the capstan motor 45 is driven by a commercial power source 46 to run a magnetic tape 48 by a capstan roller 47. The movable contact 50 of a first change switch 49 is transferred to the side of a stationary contact 51, and the movable contact 53 of a second change switch 52 is shifted to the side of a stationary contact 54. Under such condition, a video signal is introduced through an input terminal 55 to a synchronous detector 56 to separate a video signal from a vertical synchronizing signal. Part of the vertical synchronizing signal is transmitted to an amplifier 57 through the stationary contact 54 and movable contact 53 of the first change switch 49 and then supplied to a magnetic head 58 for recording and reproducing control signals through the stationary contact 54 and movable contact 53 of the second change switch 52, and recorded at one transverse end of the magnetic tape 48 thereby to form a track 59 for the control signal. Other portions of the output from the synchronous detector 56 are supplied to a phase comparator 60 similarly through the first change switch 49. On a disc 62 carrying a magnetic head 61 for recording video signals is mounted an iron strip for detecting the position of the disc. Opposite to the locus defined by rotatable iron strip 63 is disposed a pickup coil 64. Thus the rotation of the disc 62 by a disc motor 65 causes a pulse voltage to be produced in the pickup coil 64. The pulse voltage is supplied to the phase comparator 60 to compare the phase of said pulse voltage with that of the vertical synchronizing signal. The output from the phase comparator 60 is introduced through a low pass filter 66 to a voltage controlled oscillator 67, where the frequency of oscillation is varied in accordance with the different phases and polarities of the vertical synchronizing signal and the output from the pickup coil 64. The output from the voltage controlled oscillator 67 is carried to a circuit 68 for driving the 120° mode inverter of FIG. 2 thereby to supply the 120° period rectangular wave current of FIGS. 3A and 3B to a 120° mode semiconductor inverter 69 of FIG. 2 and drive the disc motor 65 with the 120° mode rectangular wave voltage. The video signals thus obtained are recorded in the magnetic tape 48 by the magnetic head 61 positioned on the disc 62. There is also recorded the vertical synchronizing signal at the beginning ro end of the image signal track 70.

Where signals are reproduced, the movable contact 50 of the first change switch 49 is transferred to the side of a stationary contact 71, and the movable contact 53 of the second change switch 52 is shifted to the side of a stationary contact 72. The control signals recorded in the magnetic tape 48 by the magnetic head 58 for recording and reproducing control signals are read out. The signals thus read out are amplified by the amplifier 73 and introduced through the first change switch 49 to the phase comparator 60. On the other hand, with the rotation of the disc 62, the pulse output from the pickup coil 64 is also carried to the phase comparator 60. This circuit 60 compares the different phases and polarities of the two signals, and the resulting output from said circuit 60 is transferred through the low pass filter 55 to the voltage controlled oscillator 67, where the frequency of oscillation is varied in accordance with the different phases and polarities of the two signals compared by the phase comparator 60. The resulting output from the oscillator 67 is supplied, as in the preceding case, through the drive circuit 68 for the 120° mode inverter to the 120° mode semiconductor inverter to control the rotation of the disc motor 65 and thereby allow the magnetic head 61 located on the disc 62 to travel exactly on the track 70 of the video signal.

As mentioned above, use of a 120° mode rectangular wave voltage to drive a disc motor can eliminate harmonics, particularly those of the third order included in the voltage to be used in said drive, reduce irregularities in the rotation of the disc motor, thus reproducing sounds and pictures of good quality. Namely, according to the present invention, the drive circuit of FIG. 2 is connected to the inverter circuit of FIG. 1. The inverter circuit is operated with the voltage excited in the secondary coils 39 and 40 of the saturable transformer 33, namely with signals having the waveforms shown in FIGS. 3A and 3B. During the 1/6f period in which the saturable transformer 33 remains saturated, the switching transistor 20 is turned on to short both terminals of the motor 18, using the output from the secondary coil 43 of the transformer 25. This arrangement can eliminate the disturbance of voltage wave forms due to the magnetic energy stored in the motor coil thereby to render the waveform of the terminal voltage of the motor into a perfect 120° mode rectangular waveform.

What we claim is:

1. A drive circuit for an AC motor responsive to a DC source comprising switch means for periodically feeding a pair of oppositely directed sequentially derived current pulses of substantially equal amplitude and duration from the source to the AC motor at a frequency $f$, means for actuating said switch means so that each of said current pulses has a period substantially equal to 120 electrical degrees and is spaced in time from each other, and short circuit means for substantially short circuiting the motor between occurrences of said pulses provided with said switch means.

2. The circuit of claim 1 wherein said switch means includes first and second transistors, said first and second transistors having emitter collector paths respectively connected between first and second opposite polarity terminals of said source and said motor for feeding the oppositely directed currents to said motor, said means for actuating including means for alternately providing a low impedance path between the emitter and collector of said transistors at a frequency $f$.

3. The circuit of claim 1 wherein the short circuiting means includes a full wave rectifier.

4. The circuit of claim 1 further including means for deriving control signals for said switch means and said short circuiting means, said control signal deriving means including: switching means, a saturable reactor having a primary winding and secondary winding means, said secondary winding means being connected to control conduction of said switch means, a transformer having a primary winding connected between a DC source, the saturable reactor primary winding and the switching means; said transformer having a secondary winding connected to control conduction of said short circuiting means, and means for activating said switching means so that the reactor is driven to saturation, whereby current is induced in the secondary winding of the transformer to actuate the short circuit means while the reactor is saturated and current is induced in the secondary winding means of the reactor to actuate the switch means while the reactor is unsaturated.

5. The circuit of claim 4 wherein said switch means includes first and second transistors, said first and second transistors having emitter collector paths respectively connected between first and second opposite polarity terminals of said source and said motor for feeding the oppositely directed currents to said motor, said transformer primary winding having a tap connected to one end of the primary winding of the reactor, impedance means connecting the other end of the reactor primary winding to opposite terminals of the DC source connected to the reactor primary winding, and separate switch means for feeding oppositely directed currents from opposite terminals of the DC source connected to the reactor primary winding to opposite terminals of the transformer primary winding so that opposite polarity currents are induced in the secondary winding means, and means for connecting the secondary winding means to control electrodes of said first and second transistors.

6. The circuit of claim 5 wherein said impedance means includes capacitor means connected across the opposite terminals of the DC source, said capacitor means having a tap connected to said other end of the reactor primary winding.